March 2, 1965  D. F. BUSER ETAL  3,171,682
FOLDING VEHICLE SEATS
Filed Sept. 23, 1963  2 Sheets-Sheet 1
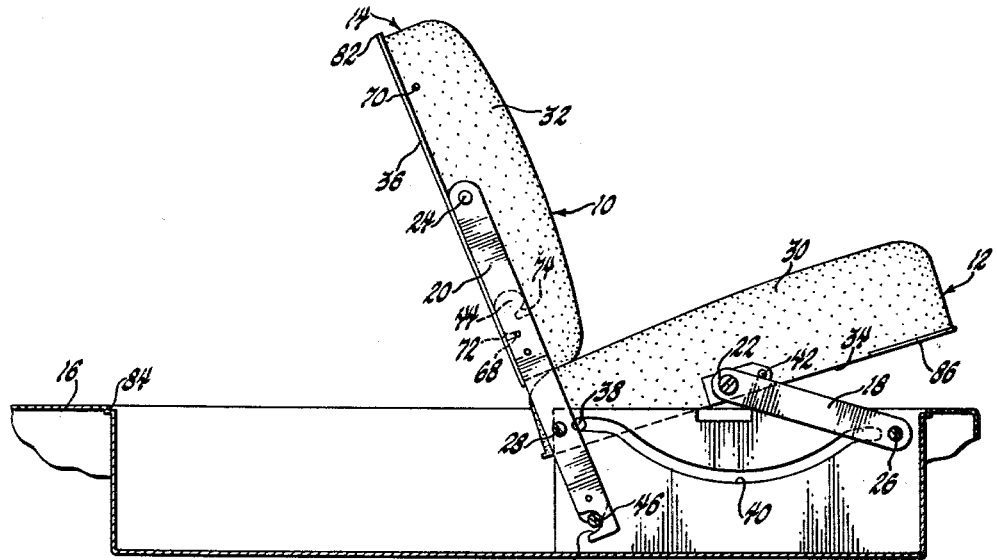
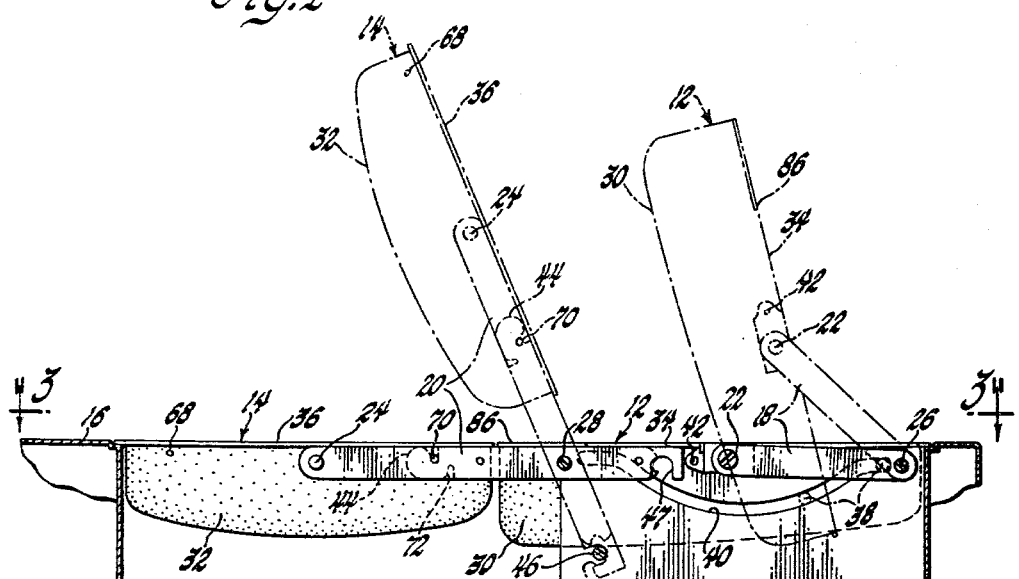
INVENTORS
Donald F. Buser &
BY Robert W. Plume
C. L. Spencer
ATTORNEY March 2, 1965  D. F. BUSER ETAL  3,171,682
FOLDING VEHICLE SEATS
Filed Sept. 23, 1963  2 Sheets-Sheet 2

INVENTORS
Donald F. Buser &
BY Robert W. Plume
C. L. Spencer
ATTORNEY

United States Patent Office 3,171,682
Patented Mar. 2, 1965

3,171,682
FOLDING VEHICLE SEATS
Donald F. Buser and Robert W. Plume, Utica, Mich., assignors to General Motors Corporation, Detroit, Mich., a corporation of Delaware
Filed Sept. 23, 1963, Ser. No. 310,562
7 Claims. (Cl. 296—66)

This invention relates to folding vehicle seats and more particularly to a convertible vehicle seat assembly for use in a multi-purpose vehicle body.

The vehicle seat assembly of this invention is intended primarily for use in multi-purpose vehicle bodies such as station wagons. Station wagon bodies generally have provisions for a front or driver's seat and a foldable second seat or second and third seats which may be used in an upright seat forming position to carry passengers and in an auxiliary floor portion for carrying cargo when folded. The optional third seat is generally facing to the rear but in some cases a forward facing third seat is provided. A third seat is generally positioned in the area of the rear axle in a station wagon body where the available vertical space is limited. A forward facing third seat is generally favored but storing such a seat assembly often presents a problem.

Forward facing third seats now available have complicated linkages for pivoting the seat cushion and seat back into their auxiliary floor forming position, often requiring several operations to move each unit into its floor forming position.

It is an object of this invention to provide a forward facing third seat assembly foldable to provide a maximum cargo carrying space.

It is another object of this invention to provide a new and novel linkage for a forward facing third seat.

Another object of this invention is to provide a linkage for the seat whereby the seat may be rotated in place from a seat forming position and positioned to form an auxiliary floor portion.

A further object of this invention is to provide a pivoting support link for the seat back which permits the seat to be rotated in place and then positioned in an auxiliary floor forming position juxtaposed the folded seat.

Another object of this invention is to provide a support link for a seat back which automatically releases the linkage when the seat back has been rotated from the cushion exposed, seat forming position to the auxiliary floor portion exposed, auxiliary floor forming position.

These and other objects and advantages will become more apparent as reference is had to the following specification and accompanying drawings wherein:

FIGURE 1 is a side view, with sections broken away, of a forward facing third seat mounted in a vehicle body and employing the novel linkage of this invention and being positioned in the seat forming position.

FIGURE 2 is a side view of the folded seat back and seat in their auxiliary floor forming position with phantom lines showing the seat back and the seat cushion at an intermediate position during rotation into the floor forming position.

It is to be understood that the linkages for supporting the vehicle seat are the same on each side of the seat and identical numbers will be used to identify identical parts.

Figure 3:
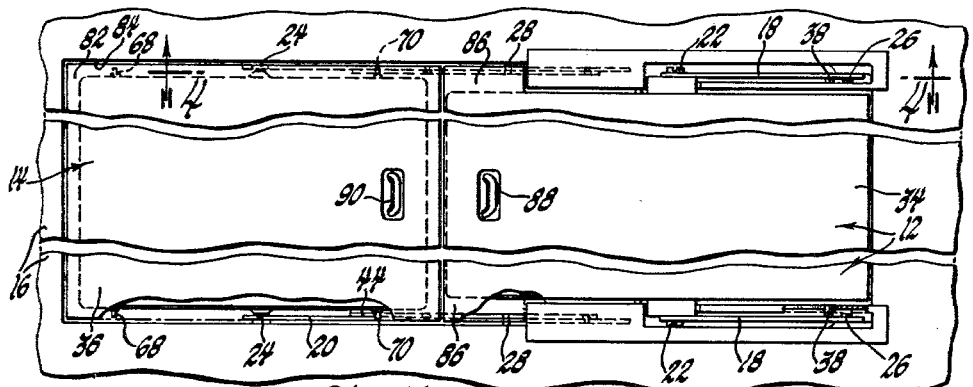
FIGURE 3 is a top view, with sections broken away, taken substantially along the line 3—3 of FIGURE 2 showing both the seat back and seat in the auxiliary floor forming position.

Referring to the drawings, as best seen in FIGURE 1, a vehicle seating assembly, indicated generally by the numeral 10, consisting of a seat unit 12, a seat back unit 14 and supporting linkages is supported in a seat forming position in a vehicle body 16. The supporting linkages include a seat link 18 and a seat back link 20 which are pivotally connected to the seat unit 12 and to the seat back unit 14, respectively, by rivets 22, 24. The links 18 and 20 are also pivotally connected to the vehicle body 16 by rivets 26 and 28, respectively. The seat unit 12 and the seat back unit 14 each consist of a cushion portion 30, 32 and an auxiliary floor portion 34, 36, respectively.

The seat unit 12 is supported on the vehicle body 16 by the link 18 and a guide pin 38 secured to the seat unit and supported in a guide pin slot 40 formed in the vehicle body. A stop pin 42, secured to the seat unit 12, contacts the seat link 18 when the guide pin 38 is in the extreme rear position of the slot 40, most remote from rivet 26; thus blocking the link 18 from further movement for positioning and supporting the seat unit 12 in the seat forming position.

Figure 4:
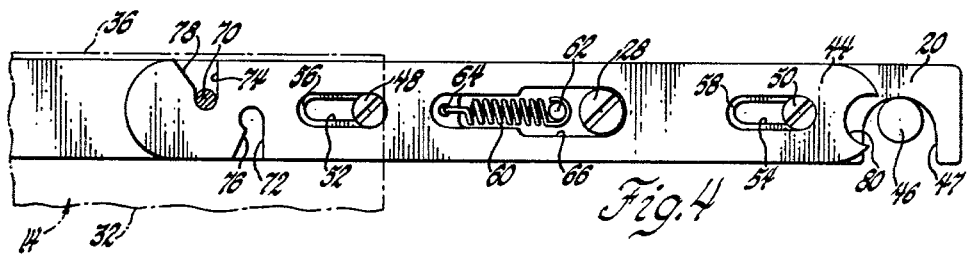
FIGURE 4 is an enlarged view taken substantially along the line 4—4 of FIGURE 3 showing the position of the locking link when the seat back has been rotated to the auxiliary floor portion exposed position.
Figure 5:
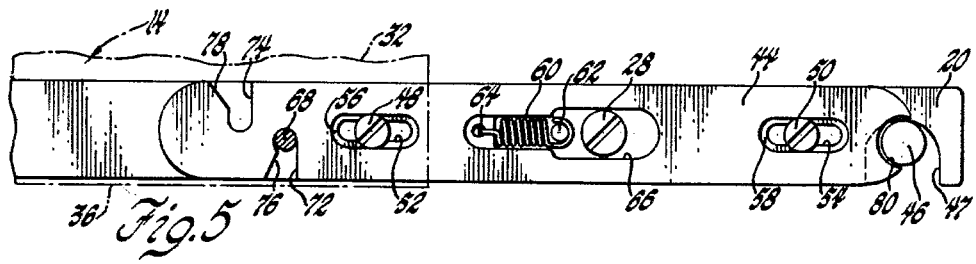
FIGURE 5 is the same view as FIGURE 4 when the seat back unit is in seat forming position showing the position of a locking link and seat back link.
Figure 6:
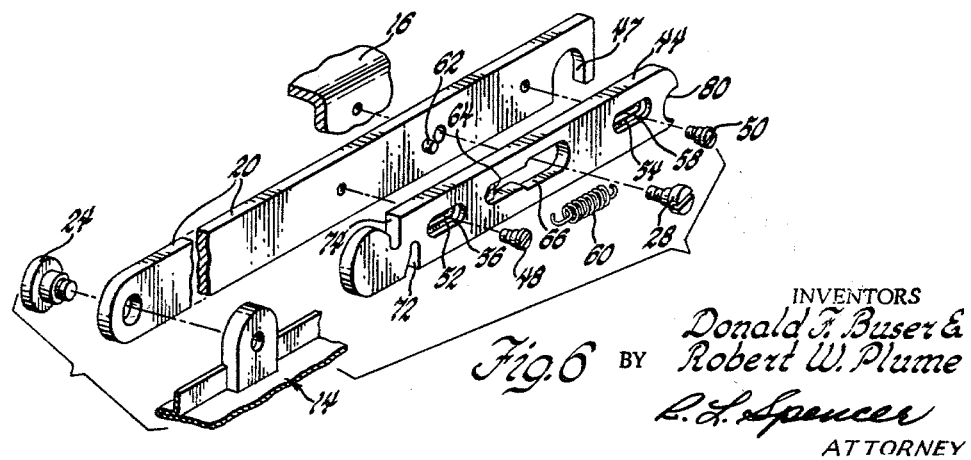
FIGURE 6 is an exploded perspective view of the seat back link and locking link.

The seat back unit 14 is supported in the vehicle body 16 by the seat back link 20. A locking link 44, best seen in FIGURES 4-6, is slidably secured to the seat back link 20 for securing the seat back link 20 to a locking pin 46 secured to the vehicle body 16. A locking pin slot 47 is formed in the seat back link 20 to receive the locking pin 46 for limiting movement of link 20 and positioning the seat back unit 14 in the seat forming position.

As best seen in FIGURES 4-6, the locking link 44 is slidably secured to the seat back link 20 by two screws 48, 50 which are positioned in slots 52, 54, respectively, of the locking link 44 and screwed into the seat back link for limiting the sliding movement of locking link 44 relative to link 20 between a locked position and an unlocked position. The slots 52, 54 have shoulder portions 56, 58, respectively, which cooperate with the heads of screws 48, 50 for holding the locking link 44 in sliding contact with the seat back link 20. A spring 60, having one end secured to an anchor pin 62 on the seat back link 20 and the other end anchored in an aperture 64 in locking link 44, is used to bias the locking link 44 toward the locked position, as shown in FIGURE 5. A clearance slot 66 is formed in locking link 44 to clear rivet 28 during movement of the locking link and also to accommodate the spring 60. A pair of pins 68, 70, see FIGURES 1, 4 and 5, are secured to the side of seat back unit 14 in positions to cooperate with a pair of notches 72, 74 formed on opposite sides of locking link 44. Pin 68 cooperates with slot 72 when the seat back unit 14 is moved to the cushion exposed seat forming position for holding the seat back unit in such position and pin 70 cooperates with slot 74 for moving the link 44 to unlocked position when the seat back unit 14 is moved to the auxiliary floor portion exposed position.

As best seen in FIGURES 4 and 5, slots 72 and 74 each has a sloped surface 76 and 78, respectively, for receiving the pins 70, 68. The end of locking link 44 adjacent slot 47 of seat back link 20 has a half-moon shaped slot 80 which engages locking pin 46 when the seat back unit 14 is in the cushion exposed seat forming position and secures the seat back unit in such position. When the holding pin 68 is moved into slot 72 the sloped surface 76 moves the locking link 44 half the distance required to move the locking link from locking engagement with pin 46 and seats holding pin 68 in slot 72 for holding the seat back cushion 32 exposed for use in the seat forming position. However, when actuator pin 70 is moved into slot 74 the sloped surface 78 cooperating with pin 70 moves the locking link 44 to unlock position, as shown in FIGURE 4, thus releasing the seat back link 20 for movement from the seat forming position to the auxiliary floor forming position.

In operation, beginning with the seat unit 12 and seat back unit 14 in the seat forming position with the cushions 32 and 30 exposed, as best seen in FIGURE 1, the seat unit 12 is rotated counterclockwise about pivot 22 to the auxiliary floor forming position. During such counterclockwise rotation, the guide pin 38 moves along slot 40, as best seen in FIGURE 2, until the seat unit 12 assumes the auxiliary floor-forming position, as best seen in FIGURE 2. Then the seat back unit 14 is rotated clockwise about pivot 24 until pin 70 coacting with slope surface 78 moves into slot 74 at which point the auxiliary floor forming portion is exposed for use. As the actuator pin 70 moves into slot 74, locking link 44 is moved to the unlocked position, as best seen in FIGURE 5, releasing the seat back unit from the locking pin 46 and allowing it to swing counterclockwise about pivot 28 to the auxiliary floor forming position, as shown in FIGURE 2. As best seen in FIGURES 1 and 3, the seat back unit 14 has a flange portion 82 which extends beyond the cushion 32 and cooperates with a notch portion 84 in the vehicle body 16 for supporting the seat back unit 14 in the auxiliary floor forming position. The seat unit 12 is supported in auxiliary floor forming position by flanges 86 which support the end adjacent the seat back unit on the folded links 20 and 44 while the other end is supported by the guide pins 38 in the slot 40. The seat unit 12 has a handle 88 positioned in the auxiliary floor portion for lifting the seat unit 12 from the auxiliary floor position and a handle 90 is positioned in the auxiliary floor portion of the seat back unit 14 for lifting that unit from the stored auxiliary floor forming position.

Thus, it can be seen, a compact seating assembly which occupies a minimum of space and has a linkage arrangement and locking means that are easily operated is provided. Due to the compactness of the asssembly more space is available for the seat occupants or for cargo space. The simple linkages and locking means are inexpensive to manufacture and assemble, thus reducing the cost of the complete assembly.

While the invention has been described in detail, it is to be understood that various modifications will be apparent to those skilled in the art which may fall within the scope of the claims whih follow.

We claim:

1. In combination with a vehicle body, a foldable vehicle seat assembly mounted in said body, said seat assembly having a seat unit and a seat back unit, means for supporting said seat assembly including a first link having one end pivotally connected to said seat unit and the other end pivotally connected to said body, a locking pin secured to said body, a second link having one end pivotally connected to said seat back unit and a free end adapted to contact said locking pin for positioning said seat back unit, said second link being pivotally secured to said body at a point intermediate said ends, and a locking link movably mounted on said second link for movement into and from engagement with said locking pin when said free end of said second link contacts said locking pin, said locking link engaging said locking pin for securing said second link from movement.

2. In combination with a vehicle body, foldable vehicle seat assembly mounted in said body having an upright seat forming position and a folded auxiliary floor forming position and being adapted to movement therebetween, said seat assembly having a seat unit and a seat back unit, means for supporting said seat assembly including a first link having one end pivotally connected to said seat unit and the other end pivotally connected to said body, a guide slot in said body, a guide pin secured to said seat unit and positioned in said guide slot for supporting said seat unit in each position and for guiding said seat unit during movement from one position to the other, a locking pin secured to said body, a second link having one end pivotally connected to said seat back unit and a free end adapted to contact said locking pin for positioning said seat back unit in said seat forming position, said second link being pivotally secured to said body at a point intermediate said ends, and a locking link movably mounted on said second link for movement into and from engagement with said locking pin when said free end of said second link contacts said locking pin, said locking link engaging said locking pin for securing said second link from movement when said seat back is in seat forming position.

3. In combination with a vehicle body, a foldable vehicle seat assembly mounted in said body, said seat assembly having a seat forming position and a folded auxiliary floor forming position and being movable therebetween, said seat assembly having a seat unit and a seat back unit, means for supporting said seat assembly including a first link having one end pivotally connected to said seat unit and the other end pivotally connected to said body, a stop pin secured to said seat unit for coacting with said first link for stopping and supporting said seat unit in said seat forming position, a guide slot in said body adjacent said seat unit, a guide pin secured on said seat unit and being positioned in said guide slot for supporting said seat unit and for guiding said seat unit during movement between said seat forming position and said auxiliary floor forming position, a locking pin secured to said body, a second link having one end pivotally connected to said seat back unit and a free end adapted to contact said locking pin for positioning said seat back unit in said seat forming position, said second link being pivotally secured to said body at a point intermediate said ends, and a locking link movably mounted on said second link for movement into engagement with said locking pin when said free end of said second link contacts said locking pin and said seat back unit is in said seat forming position, said locking link engaging said locking pin for securing said second link from movement.

4. In combination with a vehicle body, a foldable vehicle seat assembly mounted in said body, said seat assembly having a seat forming position and a folded auxiliary floor forming position and being movable therebetween, said seat assembly having a seat unit and a seat back unit, each of said units having a cushion for use in said seat forming position and an auxiliary floor forming portion for use in said auxiliary floor forming position, means for supporting said seat assembly including a first link having one end pivotally connected to said seat unit and the other end pivotally connected to said body, a stop pin secured to said seat unit for coacting with said first link for stopping and for supporting said seat unit in said seat forming position, a guide slot in said body adjacent said seat unit, a guide pin secured on said seat unit and being positioned in said guide slot for supporting said seat unit and for guiding said seat unit between said seat forming position and said auxiliary floor forming position, a locking pin secured to said body, a second link having one end pivotally connected to said seat back unit and a free end adapted to contact said locking pin for positioning said second link in said seat forming position, said second link being pivotally secured to said body at a point intermediate said ends, a locking link movably mounted on said second link for movement into engagement with said locking pin when said free end of said second link contacts said locking pin and said seat back unit is in said seat forming position, said locking link engaging said locking pin for securing said second link from movement, and actuator means on said seat back unit for moving said locking link from engagement with said locking pin.

5. Apparatus as claimed in claim 4 having said actuator means responsive to the position of said seat back unit for moving said locking link.

6. In a vehicle body, a folding vehicle seat assembly mounted within said body having an upright seat forming position and a folded auxiliary floor forming position and being movable therebetween, said seat assembly having a seat unit and a seat back unit, each of said units having a cushion for use in said seat forming position and an auxiliary floor forming portion for use in said auxiliary floor forming position, a first link member having one end pivotally connected to said seat unit and the other end pivotally connected to said vehicle body for pivoting said seat unit between said cushion useable seat forming position and said auxiliary floor portion useable auxiliary floor forming position, a guide pin secured to said seat unit, a guide slot formed in said vehicle body for cooperating with said guide pin for supporting said seat unit and for guiding said seat unit between said seat forming position and said floor forming position, a second link member having one end pivotally secured to said seat back unit and being pivotally secured to said vehicle body at a point intermediate the ends of said link for supporting said seat back in said cushion useable seat forming position and during movement to said auxiliary floor forming position, a stop member secured to said frame, a free end of said second link adapted to cooperate with said stop member for positioning said second link for supporting said seat back unit in seat forming position, a locking link movably secured to said second link member, said locking link having a locked position and an unlocked position and being movable therebetween, biasing means urging said locking link to said locked position, means for moving said locking link from said locked position to said unlocked position, said locking link cooperating with said stop member and said second link for holding said seat back unit in seat forming position when said locking link is in said locked position, and flange means for supporting said seat back unit and said seat unit on said body when in said auxiliary floor forming position.

7. In combination in a vehicle body, a convertible seat assembly having a seat forming position and an auxiliary floor forming position and being movable therebetween, said seat assembly having a seat unit and a seat back unit, each of said units having a cushion for use in the seat forming position and an auxiliary floor portion for use in the auxiliary floor forming position, means for supporting said seat assembly including a first link having one end pivotally connected to said seat unit and the other end pivotally connected to said body, a stop pin secured to said seat unit for coacting with said first link for stopping and supporting said seat unit in seat forming position, a guide slot formed in said body, a guide pin secured to said seat unit and being positioned in said guide slot for supporting said seat unit and for guiding said seat unit between said seat forming position and said auxiliary floor forming position, a locking pin secured on said body, a second link pivotally secured on said body at a point intermediate its ends, one end of said second link being pivotally secured to said seat back unit for supporting said seat back unit, a free end of said second link adapted to contact said locking pin for positioning said second link in seat forming position whereby said seat back unit is positioned in seat forming position, a locking link movably connected to said second link for movement relative thereto, said locking link having a locked position and an unlocked position and being movable therebetween, biasing means urging said locking link toward said locked position, said locking link coacting with said locking pin for securing said second link in said seat forming position, a first pin on said seat back unit for contacting and moving said locking link from said locked position to said unlocked position whereby said auxiliary floor portion of said seat back unit is held exposed for use in said auxiliary floor position, a second pin on said seat back positioned for coacting with said locking link for holding said seat back unit in said seat forming position with said cushion exposed for use.

References Cited in the file of this patent

UNITED STATES PATENTS

| 1,608,064 | Henry | Nov. 23, 1926 |
| 2,815,796 | Labanoff | Dec. 10, 1957 |
| 2,916,325 | Estes et al. | Dec. 8, 1959 |
| 2,926,951 | Koplin | Mar. 1, 1960 |
| 2,987,344 | Hershey | June 6, 1961 |
| 3,013,838 | Semar et al. | Dec. 19, 1961 |

FOREIGN PATENTS

| 1,217,149 | France | Dec. 7, 1959 |